United States Patent
Carlie et al.

(10) Patent No.: US 9,575,248 B2
(45) Date of Patent: Feb. 21, 2017

(54) OPTICAL FIBER FOR THE REDUCTION OF STIMULATED BRILLOUIN SCATTERING IN HIGH-POWER APPLICATIONS

(71) Applicant: SCHOTT CORPORATION, Elmsford, NY (US)

(72) Inventors: Nathan Aaron Carlie, Waverly, PA (US); Mark J. Davis, Clarks Summit, PA (US); Eric H. Urruti, Duryea, PA (US); Simi George, Pittston, PA (US); Joseph Hayden, Clarks Summit, PA (US)

(73) Assignee: SCHOTT CORPORATION, Elmsford, NY (US)

(*) Notice: Subject to any disclaimer, the term of this patent is extended or adjusted under 35 U.S.C. 154(b) by 367 days.

(21) Appl. No.: 14/217,900

(22) Filed: Mar. 18, 2014

(65) Prior Publication Data

US 2016/0161670 A1    Jun. 9, 2016

Related U.S. Application Data

(60) Provisional application No. 61/789,242, filed on Mar. 15, 2013.

(51) Int. Cl.
*G02B 6/02* (2006.01)
*G02B 6/036* (2006.01)
*C03C 13/04* (2006.01)

(52) U.S. Cl.
CPC ........ *G02B 6/03694* (2013.01); *C03C 13/045* (2013.01); *C03C 13/048* (2013.01); *G02B 6/02* (2013.01)

(58) Field of Classification Search
CPC .. G02B 6/03694; C03C 13/045; C03C 13/048
USPC ........................................................ 385/123
See application file for complete search history.

(56) References Cited

U.S. PATENT DOCUMENTS

| | | | |
|---|---|---|---|
| 5,609,665 A | 3/1997 | Bruce et al. | |
| 6,128,430 A | 10/2000 | Chu et al. | |
| 6,374,641 B1 | 4/2002 | Chu et al. | |
| 6,952,519 B2 | 10/2005 | Bickham et al. | |
| 7,082,243 B2 | 7/2006 | Bickham et al. | |
| 7,228,039 B2 | 6/2007 | Bickham et al. | |
| 7,558,461 B2 | 7/2009 | Chen et al. | |
| 7,627,219 B2 | 12/2009 | DiGiovanni et al. | |
| 7,689,083 B1 | 3/2010 | Rosenblum | |
| 7,689,093 B2 | 3/2010 | Matthijsse et al. | |
| 7,733,561 B2 | 6/2010 | Mermelstein et al. | |
| 9,139,467 B2 | 9/2015 | Ballato et al. | |
| 2005/0105867 A1* | 5/2005 | Koch, III ........... | G02B 6/02338 385/125 |
| 2007/0019283 A1 | 1/2007 | Mermelstein et al. | |
| 2007/0116416 A1 | 5/2007 | Chen et al. | |
| 2009/0116800 A1 | 5/2009 | DiGiovanni et al. | |

FOREIGN PATENT DOCUMENTS

| | | |
|---|---|---|
| EP | 0761616 A2 | 3/1997 |
| WO | 98/58884 A1 | 12/1998 |

OTHER PUBLICATIONS

H. Lee et al., "Suppression of Stimulated Brillouin Scattering in Optical Fibers Using Fiber Bragg Gratings", Optics Express, vol. 11, No. 25 (Dec. 15, 2003) pp. 3467-3472.
Y. Koyamada et al., "Stimulating and Designing Brillouin Gain Spectrum in Single-Mode Fibers", Journal of Lightwave Technology, vol. 22, No. 2 (Feb. 2004) pp. 631-639.
International Search Report dated Sep. 1, 2014 issued in corresponding PCT/US2014/030192 application (pp. 1-8).
Written Opinion dated Sep. 1, 2014 issued in corresponding PCT/US2014/030192 application (pp. 1-7).
A.C. Liu et al., "Measurement of the Electrostrictive Constants of Silica and Their Impact on Poled Silica Devices", Proceedings of SPIE, vol. 4216 (2001) pp. 119-128.
L. Thevenaz et al., "Electrostrictive Nonlinearity in Optical Fiber Deduced from Brillouin Gain Measurements", Optical Fiber Communication Conference and Exhibit, Technical Digest, Conference Edition, 1998 OSA Technical Digest Series, vol. 2 (Feb. 22, 1998) pp. 253-254.
Y.M. Shkel et al., "Material Parameters for Electrostriction", Journal of Applied Physics, vol. 80, No. 8 (Oct. 15, 1996) pp. 4566-4572.
S.T. Misture et al., "Measurement of the Electrostrictive Coefficients of Modified Lead Magnesium Niobate Using Neutron Powder Diffraction", Applied Physics Letters, vol. 72, No. 9 (Mar. 2, 1998) pp. 1042-1044.
R.M. Waxler et al., "Laser Glass Composition and the Possibility of Eliminating Electrostrictive Effects", IEEE Journal of Quantum Electronics, vol. 7, No. 4 (Apr. 1971) pp. 166-167.
E.M. Dianov et al., "Electrostriction Mechanism of Soliton Interaction in Optical Fibers", Optics Letters, vol. 15, No. 6 (Mar. 15, 1990) pp. 314-316.
N. Godbout et al., "Measurements and Calculation of Electrostrictive Effects in a Twin-Hole Silica Glass Fiber", Journal of the Optical Society of America B, vol. 17, No. 1 (Jan. 2000) pp. 1-5.

* cited by examiner

*Primary Examiner* — Jerry Blevins
(74) *Attorney, Agent, or Firm* — Millen, White, Zelano, Branigan, P.C.

(57) ABSTRACT

The invention relates to an optical fiber comprising a core and a cladding, wherein the core is made of a glass composition having a near-zero electrostrictive coefficient $M_{11}$, to reduce the effect of stimulated Brillouin Scattering (SBS). The invention further relates to a compensation fiber segment for connection to a silica optical fiber, the compensation fiber segment being made of a glass composition having an electrostrictive coefficient that opposes that of the silica optical fiber so that an acoustic wave transmitted to compensation fiber segment from the silica optical fiber will generate an acoustic wave within the compensation fiber segment that is about 180 degrees out of phase with the that acoustic wave transmitted from the silica optical fiber, thereby minimizing the effect of stimulated Brillouin Scattering.

22 Claims, No Drawings

OPTICAL FIBER FOR THE REDUCTION OF STIMULATED BRILLOUIN SCATTERING IN HIGH-POWER APPLICATIONS

SUMMARY OF THE INVENTION

The invention relates to means and methods for reducing or minimizing the impact of stimulated Brillouin Scattering (SBS) in both fiber laser gain media and in standard delivery fiber. In particular, the invention relates to modification and manipulation of the electrostrictive coefficient in order to reduce SBS.

The achievable maximum average power in Yb-doped high power laser fiber is currently limited to about 1 kW by the onset of Stimulated Brillouin Scattering (SBS) and modal instability (MI) in silica-based laser fibers. Both of these effects limit the effective maximum output attainable from fiber lasers.

Modal instability is, to best current understanding, most important in the gain medium where the absorption of the $Yb^{3+}$ dopant ions leads to a large heat input per unit length in the fiber. This heating of the fiber core induces an increase in its refractive index relative to the core and a transition from single-mode to multi-mode guiding. Additionally, it is suspected that longitudinal variation of the index leads to mixing of the fundamental and higher order guided mode. This variation of the mode profile causes leakage of light from the core to the cladding layer of the fiber.

In contrast, SBS is caused by high intensity light (generally in the $GW/cm^2$ range at KW average powers) which activates the electrostrictive effect in the glass comprising the fiber. As described in U.S. Pat. No. 7,627,219 (DiGiovanni et al.), an optical signal travelling through the core of the fiber is scattered in the backward direction by acoustic waves which are created through the electrostrictive effect. Because the process is driven by light intensity, attempts to reach higher power tend to cause a greater amount of back-scattered light without increased output.

The effect of SBS limits the possible maximum length of fiber which may be used. Due to the formation and propagation of the acoustic wave in the fiber core, SBS induces a grating effect which increases with length. As the grating effect caused by SBS strengthens with length due to acoustic guiding, this leads to increased back-scatter of the light and loss of transmitted intensity, important to both the gain fiber and delivery fiber.

SBS and MI have opposite dependencies on core diameter and numerical aperture (NA) or the differential between the core and clad layer refractive indices. In an optical fiber the NA is equal to the square root of $(n_1^2-n_2^2)$ where $n_1$ is the refractive index of the core and $n_2$ is the refractive index of the cladding.

For example, in a single mode laser fiber, the larger the core diameter the smaller the necessary index of refraction differential between the core and the cladding needs to be for single-mode guiding (i.e., the smaller the NA). A small diameter core tends to decrease the effect of MI due to a lower amount of mixing from high-order modes and due to a commensurate increase in the NA of the fiber which gives stronger guiding On the other hand, peak light intensity is inversely proportional to the square of the radius of the core. Higher light intensity increases the SBS effect. So, a larger core diameter reduces peak intensity and thereby reduces SBS. As a result, it is currently not possible to simultaneously minimize both SBS and MI while increasing maximum output power.

Various attempts have been made to minimize the impact of both effects, particularly SBS, through the use of dopants and specially designed profiles used for the core-clad interface have been demonstrated.

Chen et al. (US 2007/0116416; U.S. Pat. No. 7,558,461) discloses an optical fiber having a core (silica) containing an updopant (e.g., germanium) and a cladding, wherein the core has two regions. One of the core regions is codoped with aluminum while the other is not. Alternatively, both core regions are codoped with aluminum, but the amount of aluminum dopant is different in the two regions. This permits both core regions to have similar optical refractive index and thereby maintain the desired optical profile and optical properties, while modifying the acoustic wave velocity and thereby minimizing SBS.

See also the paper by Koyamada et al., "Simulating and Designing Brillouin Gain Spectrum in Single-Mode Fibers," J. of Lightwave Tech., Vol. 22, No. 2, pp. 631-639 (February 2004) which describes the results of a study on optical fibers having F-doped claddings. One optical fiber has a Ge-doped silica core and a pure silica cladding. A second has a pure silica core and an F-doped cladding. Koyamada et al. disclose that Ge reduces both light velocity (increases refractive index) and acoustic velocity in silica, while F increases light velocity and reduces acoustic velocity. As a result, the acoustic velocity in the first fiber is higher in the cladding, while in the second fiber the acoustic velocity is higher in the core.

Hojoon et al., "Suppression of Stimulated Brillouin Scattering in Optical Fibers using Fiber Bragg Gratings," Optics Express, Vol. 11, No. 25, pp. 3467-3472 (December 2003) describe a scheme for using a single or sampled Bragg grating in an optical fiber to suppress SBS in optical fibers, and suggest that the scheme can be used in fiber lasers and amplifiers.

Rosenblum (U.S. Pat. No. 7,689,083) discloses an optical fiber having a high SBS threshold, the power level at which SBS causes a backward propagating signal. The fiber has a central core segment comprising a first region having a width of no more than 0.2 μm over a core delta % of 0.1 or greater. This region is described as having a thin refractive index profile and is said to cause the fiber to exhibit improved SBS threshold by reducing the number of acoustic guided modes.

Bickham et al. (U.S. Pat. No. 6,952,519 and U.S. Pat. No. 7,082,243) describe an optical fiber having a large optical effective area (e.g., greater than 80 μm² at 1550 nm) which raises the SBS threshold power. The fiber core comprises a central region having a maximum relative refractive index $\Delta_{1MAX}$, an intermediate region surrounding and directly adjacent the central region having a minimum relative refractive index $\Delta_{2MIN}$, and an outer region surrounding and directly adjacent the intermediate region having a maximum relative refractive index $\Delta_{3MAX}$, wherein $\Delta_{1MAX} > \Delta_{2MIN}$ and $\Delta_{3MAX} > \Delta_{2MIN}$.

DiGiovanni et al. (U.S. Pat. No. 7,627,219; US 2009/0116800) disclose a large mode high power fiber amplifier having a core region that includes a dopant (such as aluminum) in selected areas to reduce the acoustic refractive index of the core and thereby limit the spatial overlap between the acoustic and optical fields. Also, the acoustic refractive index is structured to refract the acoustic field away from the core region. These features are said to limit the amount of SBS generated.

Mermelstein et al. (U.S. Pat. No. 7,733,561; US 2007/0019283) describes a high power fiber amplifier which is segmented into separate portions that exhibit different Brillouin center frequencies. By changing the center frequencies in adjoining segments of the fiber amplifier, SBS is suppressed.

While, the above attempts have provided some reduction in SBS, the need exists for additional methods and materials for reducing SBS, particularly without increasing MI. In particular, it would be desirable to reduce SBS as much as possible, thereby permitting the effect of MI to be addressed by fiber geometry.

Thus, the invention is related to improvements in laser fibers and laser amplifiers, as well as optical fibers in general. In both systems SBS is problem as it can build with length. Typically, MI is only a problem for gain fiber because it is caused by the heat produced from the laser gain process. A power delivery fiber will be undoped and have low loss. A gain fiber will be doped and also pumped, and there will be two cladding layers. The innermost layer contains the laser output, and the outer core (first clad) will guide the pump light. This complicates design and limits degrees of freedom.

In accordance with the invention, the optical fiber, fiber laser or fiber amplifier is made from a glass having tuned acoustic and electrostrictive properties such that the SBS acoustic wave may be dispersed in order to increase the overall fiber length without additional loss due to SBS occurring. This can be achieved by either changing the composition of the fiber itself or by using segments within the fiber that dispersed the SBS acoustic wave.

The electrostrictive constant ($M_{11}$), which drives the SBS effect, can vary from negative to positive values in glasses, and is somewhat negative in silica glass. For example, in silicate glasses the electrostrictive constant ($M_{11}$) passes through 0, i.e., about −0.3 to +3.0 $m^4/V^2$. Table 1 lists the electrostrictive constant ($M_{11}$) for several materials.

TABLE 1

| Material | $M_{11}$ ($m^4/V^2$) |
|---|---|
| fused-silica | −0.18 |
| Boro-silica | −0.16 |
| Alkali-silicate (Na-silicate) | 2.97 |
| Alkali-aluminosilicate (Na-aluminosilicate) | 1.5 |

[Source: R. E. Newham, Properties of Materials: Anisotropy, Symmetry, Structure, Oxford Press, 2005]

According to one embodiment, the fiber is made from a glass exhibiting a near-zero electrostrictive coefficient $M_{11}$, for example, from −0.10 to +1.0, preferably −0.05 to +0.05, more preferably −0.01 to +0.01 $m^4/V^2$. This material may be composed of silicate, aluminosilicate, phosphate, aluminate or borate glasses, and may or may not contain a significant proportion of fluorine.

For example, the silicate glass generally contains 60 to 100 mol % $SiO_2$, 0 to 20 mol % MO (M=Mg, Ca, Sr, Ba), and 0 to 20 mol % $R_2O$ (R=Li, Na, K, Rb, Cs). Additional optional components include $Al_2O_3$, $B_2O_3$, $TiO_2$, $GeO_2$, $Nb_2O_5$ and F.

The aluminosilicate glasses generally contain 40 to 80 mol % $SiO_2$, 10 to 30 mol % $Al_2O_3$, 0 to 10 mol % $B_2O_3$, 20 to 50 mol % MO (M=Mg, Ca, Sr, Ba), and 0 to 5 mol % $R_2O$ (R=Li, Na, K, Rb, Cs). Additional optional components include $TiO_2$, $GeO_2$, $Nb_2O_5$ and F.

Typical phosphate glass contains 50 to 80 mol % $P_2O_5$, 0 to 25 mol % $R_2O$ (R=Li, Na, K, Rb, Cs), 0 to 25 mol % MO (M=Mg, Ca, Sr, Ba), and 0 to 15 mol % $Al_2O_3$. Additional optional components include $SiO_2$, $B_2O_3$, $TiO_2$, $GeO_2$, $Nb_2O_5$ and F.

According to another embodiment, the fiber is made from an aluminate glass that comprises 30 to 40 mol % $Al_2O_3$, 0 to 20 mol % $R_2O$ where $R_2O$ is the sum of $Li_2O$, $Na_2O$, $K_2O$, $Rb_2O$, and $Cs_2O$, 50 to 70 mol % MO where MO is the sum of MgO, CaO, SrO, and BaO and 10 to 25 mol % of $SiO_2$, $P_2O_5$, or $B_2O_3$. To this may be added up to 10 mol % ZnO, $ZrO_2$, $Y_2O_3$, and/or $TiO_2$, wherein optionally 0-100% of the oxides may be replaced by fluorides. Alternatively, the glass can contain higher amounts of ZnO, $ZrO_2$, $Y_2O_3$, and/or $TiO_2$, up to 20 mol %. In this case, lower amounts of $Al_2O_3$ and/or MO can be used. Thus, in this case, the aluminate glass can comprise 20 to 40 mol % $Al_2O_3$, 0 to 20 mol % $R_2O$ where $R_2O$ is the sum of $Li_2O$, $Na_2O$, $K_2O$, $Rb_2O$, and $Cs_2O$, 40 to 70 mol % MO where MO is the sum of MgO, CaO, SrO, and BaO and 10 to 25 mol % of $SiO_2$, $P_2O_5$, or $B_2O_3$. To this may be added up to 20 mol % ZnO, $ZrO_2$, $Y_2O_3$, and/or $TiO_2$, wherein optionally 0-100% of the oxides may be replaced by fluorides.

Preferably, this aluminate glass contains, in addition to $Al_2O_3$, 10-15 mol % of $P_2O_5+SiO_2$; 0-5 mol % $B_2O_3$; 0-10 mol % $ZrO_2$; 40-55 mol % CaO+MgO+SrO+BaO; 25-35 mol % $Al_2O_3$; and/or 10-20 mol % $Li_2O+Na_2O+K_2O$.

According to a further preferred embodiment, the aluminate glass contains, in addition to $Al_2O_3$, 10-15 mol % $Li_2O$; 5-10 mol % $ZrO_2$; 0% $B_2O_3$; and/or 10-15% $P_2O_5+SiO_2$.

These glasses possess refractive indices close to that of fused silica, which is necessary for minimizing insertion loss. Thus, the refractive index of the glass is preferably about 1.44 to 1.48, more preferably 1.45 to 1.47, especially 1.4550 to 1.4650, very especially 1.4580 to 1.4620.

Examples of glasses that have refractive indices close to that of fused silica include fluoro-phosphate glasses (SCHOTT's N-FK51A for instance) and fluorine containing silicate glasses (SCHOTT's F-5, F-3, for example).

To modify theses glass compositions to achieve a near zero electrostrictive coefficient $M_{11}$, one could add or vary the amount of such metal oxides as $Al_2O_3$, $Na_2O$, $Li_2O$, $K_2O$. To adjust the refractive index to be near that of silica, one can add or adjust the amount of lighter metal oxides such as oxides of Li, Na, P, Al, and B. Heavier metal oxides such as $La_2O_3$, and transition metals can increase refractive index whereas F will decrease refractive index. So a high-F glass might be able to contain some low amount of heavier metal oxides.

A glass system based on these compositions may be further designed to have a large variation in the acoustic impedance relative to the refractive index. Glasses with high modulus have low impedance (e.g., glasses containing Zr, Ti, Al, Si). Mobile ions such as Li, reduce modulus through acoustic loss. Heavy elements such as Pb, La and B, in some cases, have also been shown to increase impedance. Under such conditions, a fiber may be manufactured which will continue to guide light in the same manner as a silica fiber, but would become anti-guiding to the acoustic wave induced by SBS, dispersing the acoustic wave to the outer layers of the fiber and possibly into the jacket (i.e., the polymer layer used to protect the fiber). In addition, the glass may or may not be designed with very high acoustic loss in order to dissipate the energy as heat before the optical mode is coupled into an additional length of silica fiber. High B, Li and/or F contents may lead to glasses with high acoustic loss.

Core diameters and NA values (which are inversely related) can vary greatly. For single-mode guiding, NA is generally below 0.2, and core diameters are usually in the 10-30 micron range, but smaller diameters are possible (for example, <5 microns in specific cases).

According to a further embodiment, a compensation fiber segment is designed to have an electrostrictive coefficient that opposes that of a silica fiber, but which possesses an acoustic impedance and an acoustic radial profile that is similar to a silica fiber. The compensation fiber can be made of silica, silicate, aluminosilicate, phosphate or borate glass (e.g., a fluoro-phosphate glass). The glass used should have a refractive index that closely matches that of fused silica to minimize insertion loss. The compensation fiber would also have a core/cladding structure with the diameter of the core being the same as that of the silica fiber (to minimize insertion loss). The cladding can be made of glass, in general, having higher acoustic impedance and lower refractive index. Thus, for example, the compensation fiber segment would be made of a glass having about the same acoustic impedance and acoustic radial profile of that of a silica fiber, but which has a large positive electrostrictive coefficient as compared to the small negative coefficient of silica. In addition, this glass would have similar refractive index and radial index profile to that of the silica fiber.

In this embodiment, both the acoustic wave and optical mode would be coupled across the interface between the silica fiber and the short fiber segment with very little reflection. However, since the short fiber segment is made of a material having an electrostrictive coefficient that is opposite in sign to that of the silica fiber, the acoustic wave generated within the compensation fiber segment will be 180 degrees out of phase with the acoustic wave that is transmitted to it from the silica fiber. As a result of these competing waves moving in opposite directions and 180 degrees out of phase, the energy in the acoustic mode will be dispersed and eventually generate a new mode of opposite phase. After an appropriate length of the compensation fiber segment, an acoustic mode would be generated that is of approximately equal intensity to that which was coupled into it from the silica fiber. Thereafter, both the optical and acoustic modes of the compensation fiber segment are coupled into another length of silica fiber. This silica fiber in turn would again generate an SBS signal 180 degrees out of phase, thereby dispersing the acoustic energy before building addition energy into the new acoustic mode. As the magnitude of the electrostrictive coefficient of the glass used in the compensation fiber segment can be much larger (up to about 10×) that of the silica fiber, the length of the compensation fiber may be very short, which will minimize the effect of optical loss due to absorption or scatter.

By creating long fibers which are comprised of alternating sections of silica fiber and compensating fiber, the build-up of acoustic energy leading to large SBS losses may be avoided over greater distances.

EXAMPLES

Example 1

An optical fiber is prepared in accordance with conventional procedures from a preform. The optical fiber has a core with a diameter of 10-30 microns and two claddings, one to contain pump energy and the other to guide laser output (the outermost cladding may be glass or polymer). The core is made from a fluoro-phosphate or alkali aluminosliicate glass composition. The glass cladding has a similar composition but contains higher amounts of F, P, B, Li and/or Na or less amounts of Al or Si. The refractive index of the core is 1.46 and the refractive index of the cladding is 1.4585. The electrostrictive constant M11 of the core is near zero. The fiber length is up to several meters.

Example 2

A compensation fiber segment is used to connect two silica optical fibers. The compensation fiber segment is prepared in accordance with conventional procedures from a preform. The compensation fiber segment has a core with a diameter of 10-30 microns and a cladding with a thickness of, for example, 50-100 microns The core and cladding are made of similar glass compositions containing, but the cladding contains B, or less amounts of Al or Si, or does not contain T. The refractive index of the core of compensation fiber segment is 1.46 and the refractive index of its cladding is 1.4585. The electrostrictive constant M11 of the core of the compensation fiber segment is near zero. The length of the compensation fiber segment is a few centimeters.

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An optical fiber comprising a core and a cladding, wherein the core is made of a glass composition having a near-zero electrostrictive coefficient $M_{11}$, and said glass composition is a silicate, aluminate, aluminosilicate, phosphate or borate glass composition.

2. The optical fiber according to claim 1, wherein the electrostrictive coefficient $M_{11}$ of the core is from −0.10 to +1.0 $m^4/V^2$.

3. The optical fiber according to claim 1, wherein the electrostrictive coefficient $M_{11}$ of the core is from −0.05 to +0.05 $m^4/V^2$.

4. The optical fiber according to claim 1, wherein the electrostrictive coefficient $M_{11}$ of the core is from −0.01 to +0.01 $m^4/V^2$.

5. The optical fiber according to claim 1, wherein the core is made of a fluoro-phosphate glass.

6. The optical fiber according to claim 1, wherein the core is made of an alkali aluminosliicate glass.

7. The optical fiber according to claim 1, wherein the core is made of a silicate glass comprising 60 to 100 mol % $SiO_2$, 0 to 20 mol % MO where MO is the sum of MgO, CaO, SrO, and BaO, and 0 to 20 mol % $R_2O$ where $R_2O$ is the sum of $Li_2O$, $Na_2O$, $K_2O$, $Rb_2O$, and $Cs_2O$, and optionally contains $Al_2O_3$, $B_2O_3$, $TiO_2$, $GeO_2$, $Nb_2O_5$ and/or F.

8. The optical fiber according to claim 7, wherein said silicate glass contains $Al_2O_3$, $B_2O_3$, $TiO_2$, $GeO_2$, $Nb_2O_5$ and/or F.

9. The optical fiber according to claim 1, wherein the core is made of an aluminosilicate glass comprising 40 to 80 mol % $SiO_2$, 10 to 30 mol % $Al_2O_3$, 0 to 10 mol % $B_2O_3$, 20 to 50 mol % MO where MO is the sum of MgO, CaO, SrO, and BaO, and 0 to 5 mol % $R_2O$ where $R_2O$ is the sum of $Li_2O$, $Na_2O$, $K_2O$, $Rb_2O$, and $Cs_2O$, and optionally contains $TiO_2$, $GeO_2$, $Nb_2O_5$ and/or F.

10. The optical fiber according to claim 9, wherein said aluminosilicate glass contains $TiO_2$, $GeO_2$, $Nb_2O_5$ and/or F.

11. The optical fiber according to claim 1, wherein the core is made of a phosphate glass comprising 50 to 80 mol % $P_2O_5$, 0 to 25 mol % $R_2O$ where $R_2O$ is the sum of $Li_2O$, $Na_2O$, $K_2O$, $Rb_2O$, and $Cs_2O$, 0 to 25 mol % MO where MO is the sum of MgO, CaO, SrO, and BaO, and 0 to 15 mol % $Al_2O_3$, and optionally contains $SiO_2$, $B_2O_3$, $TiO_2$, $GeO_2$, $Nb_2O_5$ and/or F.

12. The optical fiber according to claim 11, said phosphate glass contains $SiO_2$, $B_2O_3$, $TiO_2$, $GeO_2$, $Nb_2O_5$ and/or F.

13. The optical fiber according to claim 1, wherein the core has a refractive index of 1.4580 to 1.4620.

14. The optical fiber according to claim 1, wherein the core provides single-mode guiding and has NA below 0.2 and a diameter of 10-30 microns.

15. A compensation fiber segment for connection to a silica optical fiber, said compensation fiber segment comprising a core and a cladding, wherein said compensation fiber segment is made of a silicate, aluminosilicate, phosphate or borate glass composition having an electrostrictive coefficient that opposes that of the silica optical fiber so that an acoustic wave transmitted to compensation fiber segment from the silica optical fiber will generate an acoustic wave within the compensation fiber segment that is about 180 degrees out of phase with the that acoustic wave transmitted from the silica optical fiber.

16. The compensation fiber segment according to claim 15, wherein said core of said compensation fiber segment has an acoustic impedance and an acoustic radial profile similar to the silica optical fiber.

17. The compensation fiber segment according to claim 15, wherein said core of the compensation fiber segment has refractive index similar to the silica optical fiber.

18. The compensation fiber segment according to claim 15, wherein the core of said compensation fiber segment has a refractive index of 1.4580 to 1.4620.

19. The compensation fiber segment according to claim 15, wherein the core is made of a fluoro-phosphate glass.

20. The compensation fiber segment according to claim 15, wherein the core is made of an alkali aluminosliicate glass.

21. A fiber optical device comprising the compensation fiber segment according to claim 15 connected to at least one silica optical fiber.

22. The fiber optical device according to claim 21, wherein said compensation fiber segment is connected to two silica optical fibers.

* * * * *